United States Patent [19]

De Wolf et al.

[11] 4,141,137
[45] Feb. 27, 1979

[54] METHOD OF MAKING A PERMANENT MAGNET FIELD POLE FOR A DIRECT CURRENT DYNAMOELECTRIC MACHINE

[75] Inventors: Frank T. De Wolf; Dan W. Kimberlin, both of Erie, Pa.

[73] Assignee: General Electric Company, Schenectady, N.Y.

[21] Appl. No.: 845,457

[22] Filed: Oct. 25, 1977

[51] Int. Cl.$^2$ ............................................. H02K 15/02
[52] U.S. Cl. ........................................ 29/596; 29/609; 310/154; 310/218
[58] Field of Search .................. 29/596, 609; 310/218, 310/154, 42

[56] References Cited

U.S. PATENT DOCUMENTS

| | | | |
|---|---|---|---|
| 3,441,760 | 4/1969 | Collens | 310/218 X |
| 3,885,302 | 5/1975 | Boesel | 29/596 |

*Primary Examiner*—Carl E. Hall
*Attorney, Agent, or Firm*—Vale P. Myles

[57] ABSTRACT

In the method of the invention a permanent magnet field pole is manufactured by welding a plurality of preformed base member laminae to thereby form a rigid pole base member. A plurality of preformed face member laminae are secured together by rods extending through aligned apertures therein. A head on one end of each such rod cooperates with a spring clip member affixed to the other end thereof to continuously exert a resilient clamping force on the laminae thereby retaining them in a relatively flexible desired pole face configuration. The rare earth magnet sub-assemblies are made by arranging rectangular magnet bars of rare earth material in aligned configurations then adhering the bars to parallel plates positioned on opposite sides of the bars. After the adhesive used to form the sub-assemblies is cured while the plates are compressed against the magnets, adhesive is applied to the outer surfaces of the pole face member, and to the inner surfaces of the pole base member, then the magnet sub-assemblies are positioned between these members and clamped in a desired position relative thereto while pressure is applied to maintain a predetermined compressive force on the pole assemblies as the adhesive is cured. Alternative mounting means are also disclosed for mounting the magnet bar sub-assemblies between the laminated pole members.

6 Claims, 12 Drawing Figures

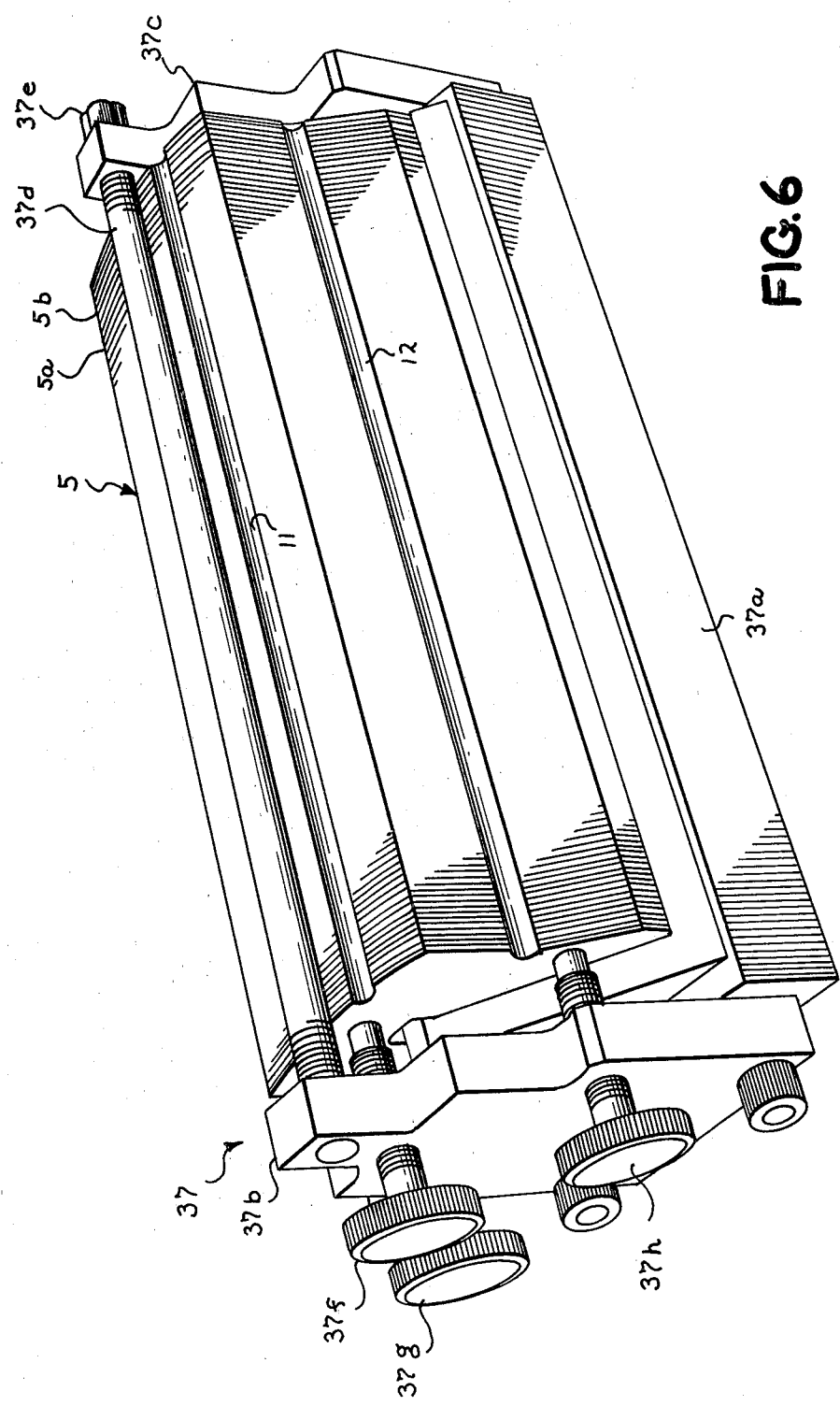

METHOD OF MAKING A PERMANENT MAGNET FIELD POLE FOR A DIRECT CURRENT DYNAMOELECTRIC MACHINE

BACKGROUND OF THE INVENTION

The invention relates to dynamoelectric machines of the type having permanent magnets positioned in the field poles thereof. More particularly, the invention relates to dynamoelectric machine field poles having rare earth magnets with relatively high coercive forces mounted in novel, pre-cured magnet sub-assemblies that are then assembled into a unique pole construction. The invention also relates to a method for manufacturing such magnet sub-assemblies and field poles.

In the manufacture of dynamoelectric machines it has long been a known practice to improve the magnetic characteristics of field poles for such machines by inserting permanent magnets into their magnetic flux paths. An early example of such use of permanent magnets is shown in U.S. Pat. No. 1,485,393 which illustrates a motor having field poles with permanent magnets mounted, respectively, at the base of each pole. As the development of such permanent magnet pole structures progressed, a number of improvements were introduced. For example, in U.S. Pat. No. 2,193,406 there is shown a pole structure in which the pole laminae are welded together to rigidify the poles and each of the poles is made longer than the machine core to improve the magnetic characteristics of the machine. In order to adjust the magnetic reluctance of various field pole arrangements, it also became common to provide shims or movable bolts for adjusting the reluctance of the field circuits. For example, U.S. Pat. No. 3,441,760 shows the use of such shims and U.S. Pat. Nos. 3,214,620 and 3,562,568 illustrate the use of adjustable bolts in dynamoelectric machines to adjust the magnetic characteristics thereof.

In more recent times the substitution of rare earth magnets, such as those made of cobalt-samariam for the earlier used Alnico and ceramic types of magnets in such field pole constructions, has become more feasible. Such rare earth permanent magnets are particularly advantageous in the manufacture of dynamoelectric machines because their high coercivity, i.e., their resistance to demagnetization, and good magnetic induction are now available at reasonable cost. Due to the high coercivity of rare earth permanent magnets, magnet length can be reduced about an order of magnitude further or can be reduced to about 10% of the length of Alnico magnets. It is often possible in the manufacture of permanent magnet dynamoelectric machines utilizing such magnets to eliminate the need for pole shoes; thus, the rotor size of the machines can be increased. With such increased rotor sizes numerous advantages are realized such as increased heat dissipation and the ability to add slots into the rotors thereby increasing the number of ampere turns, which results in proportional increases in the torque that can be developed by a machine having a given outside diameter. Alternatively, by the use of such rare earth permanent magnets, it is possible to reduce the size of a given horsepower motor relative to the size that would have previously been needed to accommodate more conventional permanent magnet pole constructions.

In the manufacture of relatively small permanent magnet d.c. motors it is known to use plate-shaped permanent magnets directly adhered to the surface of a motor housing to support pairs of such magnets in operating relationship against a common pole shoe that partially encompasses a rotor of the machine. It is also relatively common practice to provide slots in such common pole shoes in order to reduce the flux shifting in the shoes as a result of armature crossfields. Examples of such known prior art structures are illustrated in U.S. Pat. No. 3,296,471 which issued on Jan. 3, 1967. As is suggested in that patent and as is more clearly explained in U.S. Pat. No. 3,590,293, which issued on June 29, 1971 and is assigned to the assignee of the present invention, it is a well-known practice to mount permanent magnets in a dynamoelectric machine by adhering the magnets to a mounting surface with an epoxy resin or other suitable glue.

While many of the foregoing prior art methods are useful in the manufacture of relatively small permanent magnet dynamoelectric machines, it is also desirable to improve the response time and reduce the manufacturing costs of larger machines that utilize laminated, salient field poles. Thus, it would be desirable to provide means for mounting high coercive force, rare earth magnet assemblies into laminated field poles of a d.c. machine in a manner that optimizes the magnetic characteristics of the poles while reducing the overall weight of the machine required to produce a given torque or horsepower.

It is a primary object of the present invention to provide a permanent magnet dynamoelectric machine having field poles that incorporate rare earth magnet subassemblies in an optimum relationship that improves the magnetic characteristics of the poles while reducing the overall pole size required to develop a given magnetic flux at the air gap between the poles and the rotor.

Another object of the invention is to provide a permanent magnet pole for a dynamoelectric machine in which a plurality of permanent magnets in bar form are arranged in a predetermined package configuration including sheets of magnetic material cemented to the magnets which are subsequently arranged between laminated pole base and pole face members before being fixed in relation thereto by a mounting means.

Yet another object of the invention is to provide a permanent magnet field pole for a dynamoelectric machine in which a rigid pole base member supports a relatively more flexible pole face member and rare earth magnet sub-assemblies sandwiched between the pole face and base members.

Still another object of the invention is to provide a method for manufacturing a permanent magnet pole structure for a dynamoelectric machine in which the pole structure has a rigid base member and a relatively more flexible face member.

A further object of the invention is to provide a method for making a permanent magnet dynamoelectric machine pole structure in which rare earth magnet sub-assemblies are preformed and adhered together with a partially cured adhesive before magnetizing flux is applied to the sub-assembly to polarize the magnets therein.

Additional objects and advantages of the invention will be apparent from the description of it presented herein taken in conjunction with the accompanying drawings.

SUMMARY OF THE INVENTION

In one preferred embodiment of the invention a permanent magnet dynamoelectric machine is provided with a plurality of salient field poles each of which comprise a rigid laminated base member, a relatively more flexible laminated face member, and a plurality of rare earth magnet sub-assemblies mounted between the base member and face member and fixed in position relative thereto. The magnet sub-assemblies comprise a plurality of generally rectangular bar magnets arranged with one of their respective ends in alignment and secured together between a pair of generally flat magnetically permeable plates that respectively engage inner surfaces of the base member and radially outer surfaces of the pole face member.

In the method of the invention a plurality of preformed base member laminae are welded together to make a rigid, laminated base member. A plurality of pole face member laminae are secured together by a plurality of metal rods inserted through aligned apertures in the laminae and compressed against the two outermost laminae of the face member by spring clips mounted on one end of each of the rods. A plurality of magnet sub-assemblies are made by cementing rare earth magnet bars between magnetically permeable metal plates and pre-curing the cement under pressure. A magnetizing flux is applied to the magnet sub-assemblies, before they are mounted between the pole members, by placing them in a uniquely shielded fixture after the bar magnets are secured in their aligned, operating relationship between the outer plates of the sub-assemblies. Finally, the magnet sub-assemblies are clamped in predetermined positions relative to the pole face member and pole base member while the sub-assemblies are fixed between the pole members to form the desired pole construction.

BRIEF DESCRIPTION OF THE DRAWING

FIG. 6 is a perspective view of a laminated pole base member mounted in a welding fixture that is used to clamp the base member together while a plurality of weld beads are formed to join the respective laminae and rigidify the base member pursuant to the method of the present invention.

DESCRIPTION OF THE PREFERRED EMBODIMENTS

Figure 1:
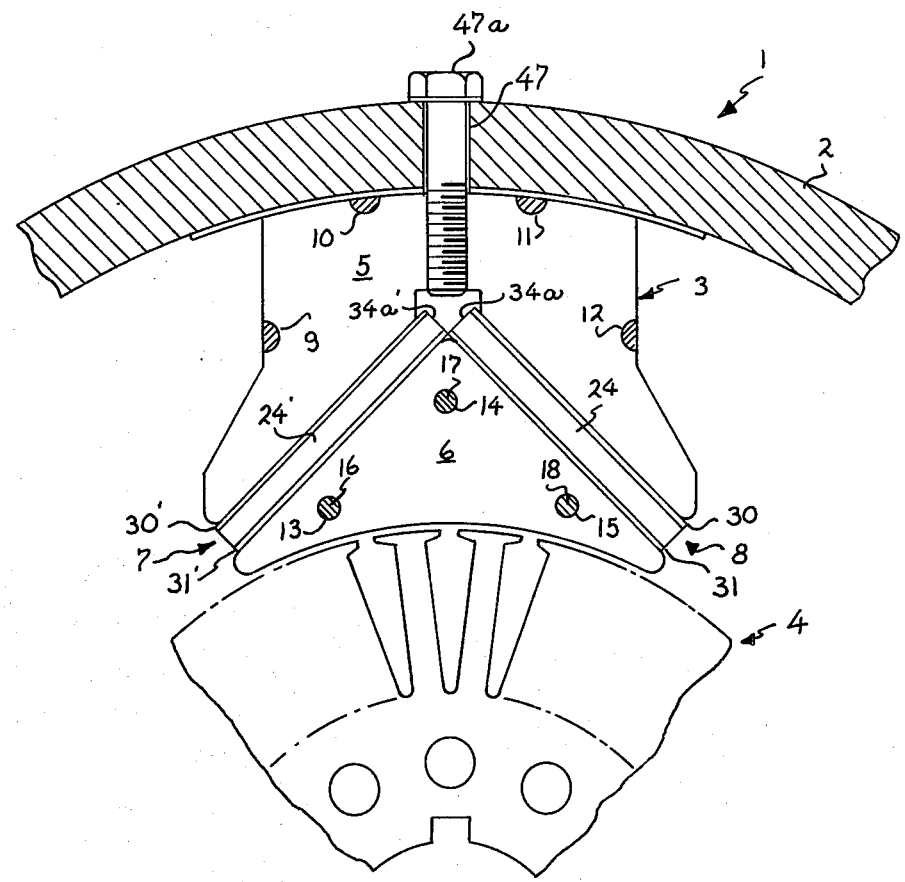
FIG. 1 is an axial elevation showing a portion of a dynamoelectric machine including a rotor and a stator on which there is mounted a salient field pole constructed pursuant to the invention.

Referring to FIG. 1 of the drawings it will be seen that there is shown a portion of a dynamoelectric machine 1 comprising a flux conducting stator 2, a salient field pole 3 and a rotor 4 concentrically mounted for rotation between the pole 3 and a plurality of similar additional salient field poles (not shown) that are also conventionally mounted around the inner circumference of the stator 3. Pursuant to the present invention the field pole 3 comprises a rigid laminated base member 5, a relatively more flexible laminated face member 6, a first rare earth magnet sub-assembly 7, and a second rare earth magnet sub-assembly 8. The magnet sub-assemblies 7 and 8 are mounted between the base member and the pole face member and fixed in relation to both of them by a suitable mounting means such as an epoxy resin cemented on the sub-assemblies in accordance with a method of manufacture that will be more fully described below. The pole base member 5 is composed of a plurality of preformed laminae 5a, 5b, etc. (see FIG. 5) that may be formed of a suitable magnetic steel conventionally used to manufacture such salient poles for dynamoelectric motors and generators. A characteristic feature of the present invention is that the field pole 3 (and all of the other field poles in the above-mentioned plurality of field poles for the machine 1) is rigidified by forming a plurality of weld beads 9, 10, 11 and 12 (shown in FIGS. 1 and 6). The weld beads each extend, respectively, across substantially all of the lamina 5a, 5b, etc., of the base member 5. Pursuant to the invention, the weld beads 9-12 are formed by a suitable conventional fusion welding process, such as by tungsten-inert-gas welding the beads along the laminae after the base member has been secured in a suitable welding fixture in a manner that will be described below in connection with the disclosure of the method steps of the invention. At this point it should be observed that the plurality of weld beads formed on each pole base member, such as those on the base member 5, comprise two spaced welds 10 and 11 on the outermost surface of the base member and two weld beads 9 and 12 formed, respectively, on opposite sides of the base member 5 adjacent the middle of those sidewalls. A novel feature of the invention is that the laminae of the pole base member are held in alignment when the weld beads 9–12 are formed thereon by positioning the flat inner surfaces of the base member laminae on an aligning jig using a pressure bar as will be more fully described below in connection with the description of the method steps of the invention.

Figure 7:
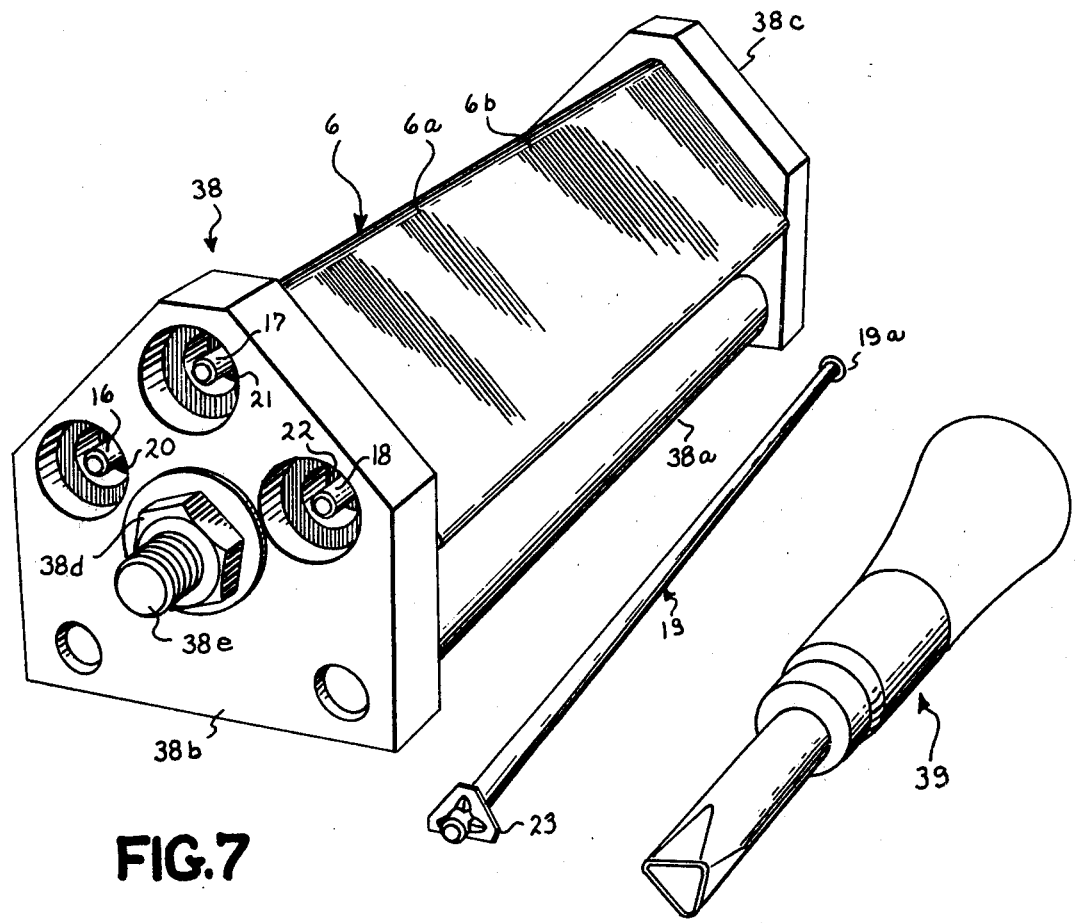
FIG. 7 is a perspective view of a laminated pole face member mounted in a riveting fixture that is used pursuant to the invention to secure the laminae of the face member in aligned position while a plurality of bars inserted through apertures in the lamina are placed in tension against the outermost faces thereof by applying spring clips to one end of each of the bars.
Figure 5:
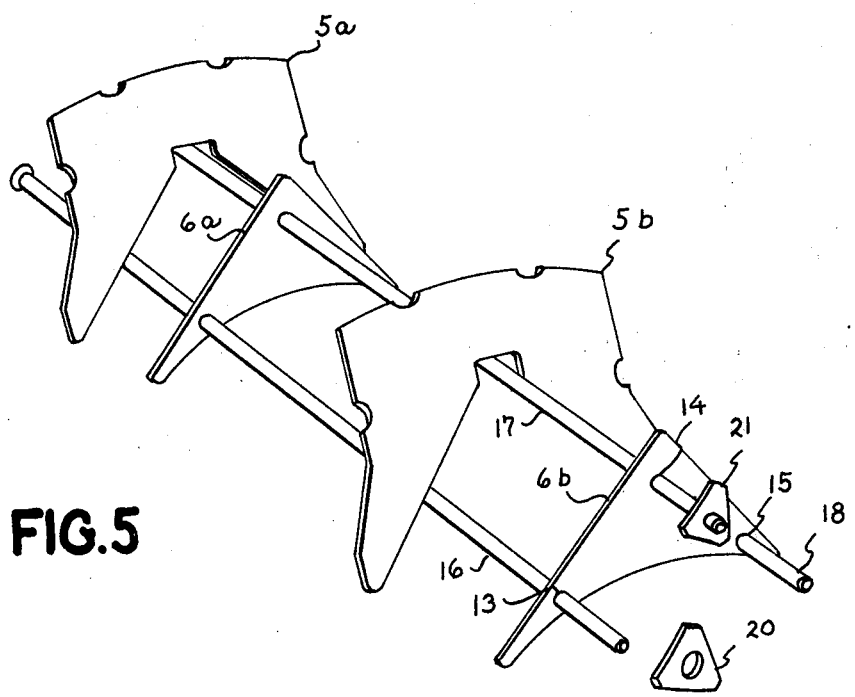
FIG. 5 is a perspective view of a plurality of magnet base member laminae and magnet pole face member laminae shown with respect to a plurality of rods inserted through aligned apertures in the pole face laminae. Spring clips illustrated on the rods are used for securing the pole face laminae in compressed operating position relative to one another.

Each of the relatively flexible pole face members in the dynamoelectric machine 1, such as the pole face member 6 illustrated in FIG. 1, comprises a plurality of laminae 6a, 6b, etc., as shown in FIGS. 5 and 7. These lamina each have a plurality of apertures 13, 14 and 15 (see FIG. 5) formed therein by any conventional technique, such as by punching the apertures when the lamina are punched. The respective apertures 13–15 in the adjacent lamina of the relatively flexible pole face member 6 are aligned with apertures in the next adjacent lamina to form passageways through the face member. A plurality of rods, such as the rods 16, 17 and 18 shown in FIGS. 1, 5 and 7, are each positioned, respectively, through one of these passageways. In order to support the laminae 6a, 6b, etc., in their desired relatively flexible arrangement while maintaining the dimensions of the pole face member within desired tolerances, a suitable means for supporting the rods 16–18 in tension against the respective outer surfaces of the two end laminae of the face member 6 is provided pursuant to the invention.

In the preferred form of the invention being described, the means for supporting the rods 16–18 in tension comprises a head formed on one end of each of the rods, such as the head 19a shown on the auxiliary rod 19 illustrated in FIG. 7. It will be understood that the rod 19 is identical to the rods 16, 17 and 18 and is simply illustrated in FIG. 7 to help explain the invention. In order to function in accordance with the invention, the head 19a on the rod 19 and the related heads on other rods for the pole face member, such as the member 6, are formed to be larger than the apertures through the laminae 6a, 6b, et cetera. A plurality of triangular spring clips 20, 21 and 22 are each mounted, respectively, on the other ends of one of the rods 16–18 and resiliently compressed against the outer surface of the end lamina of face member 6 that is juxtaposed therewith. Again, in order to clearly explain the invention, the auxiliary rod 19 in FIG. 7 is illustrated with such a spring clip 23 positioned on one of its ends. The spring clip 23 is identical in configuration and function to the associated clips used on the other rods 16–18 shown in FIG. 7. Suitable spring clips for this purpose are commercially available under Catalog No. 5305-12 or H5305-12 from Waldes Kohinoor Inc. — 47–16 Austel Place — Long Island City, N.Y. 11101.

It should be understood that alternative means may be employed to make the pole face member relatively more flexible than the rigid, welded base member 5. For example, conventional rivets may be used through the passageways formed by apertures 13, 14 and 15. In such a form of the invention the ends of the rivets would be flattened to compress the laminae 6a, 6b, etc. together and place the shanks of the rivets in tension.

In FIG. 5 there is also shown an exploded arrangement of the laminae 5a and 5b for the rigid pole base member 5 arranged in generally appropriate orientation with respect to another pair of laminae 6a and 6b for the more flexible pole face member 6, which is provided with supporting means or rods 16–18 and associated spring clips 20–22, to help the reader more completely visualize the configuration and assembly of these component parts of the preferred embodiment of the invention. Thus, as can be clearly seen in FIGS. 1 and 5, each pole face member lamina 6a, 6b, etc., is shaped generally in the form of a triangle and the plurality of apertures 13, 14 and 15 formed respectively therein comprise three apertures positioned adjacent the apices of each laminae. Of course, other arrangements of the apertures through the lamina of the face member 6 may be used in alternative forms of the invention. For example, two such apertures positioned adjacent opposite ends of the laminae to receive a pair of rivets will provide sufficient support for the pole face member.

As can be seen in FIGS. 5 and 7, in the embodiment of the invention being described, the spring clips 20–23 are preferably triangular in configuration with apertures through their central portion to receive therein the respective rods 16–19. Obviously, other configurations for these spring clips can be used if desired. It is only necessary, in order to accomplish an objective of the invention, namely, to hold the rods 16–18 in tension, that the spring clips 16–23 be formed of resilient metal or other suitably resilient and durable material so that when they are compressed in the manner that will be described more fully below in connection with the explanation of the method of the invention, that they engage the respective rods 16–18 and hold them in tension against the endmost laminae of the relatively flexible face member 6.

Figure 2:
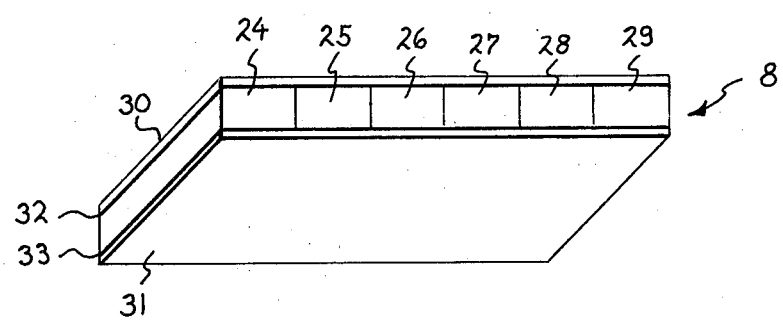
FIG. 2 is a perspective view of a rare earth magnet sub-assembly constructed in accordance with the invention and used in the pole construction illustrated in FIG. 1.
Figure 3:
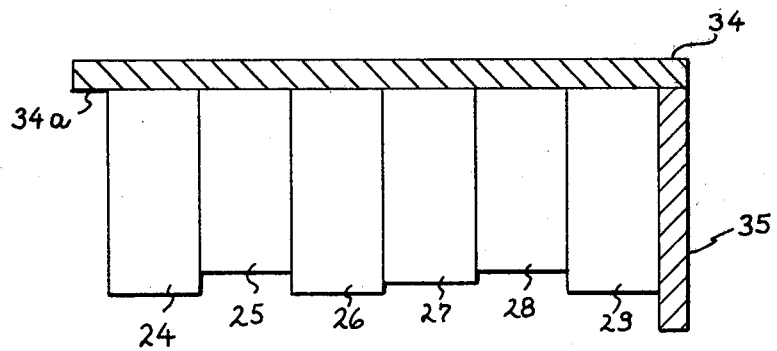
FIG. 3 is a top plan view of a plurality of rectangular bar magnets of rare earth magnetic material arranged in a positioning jig that is used to align the magnets prior to their final assembly in the magnet sub-assembly shown in FIG. 2.
Figure 4:
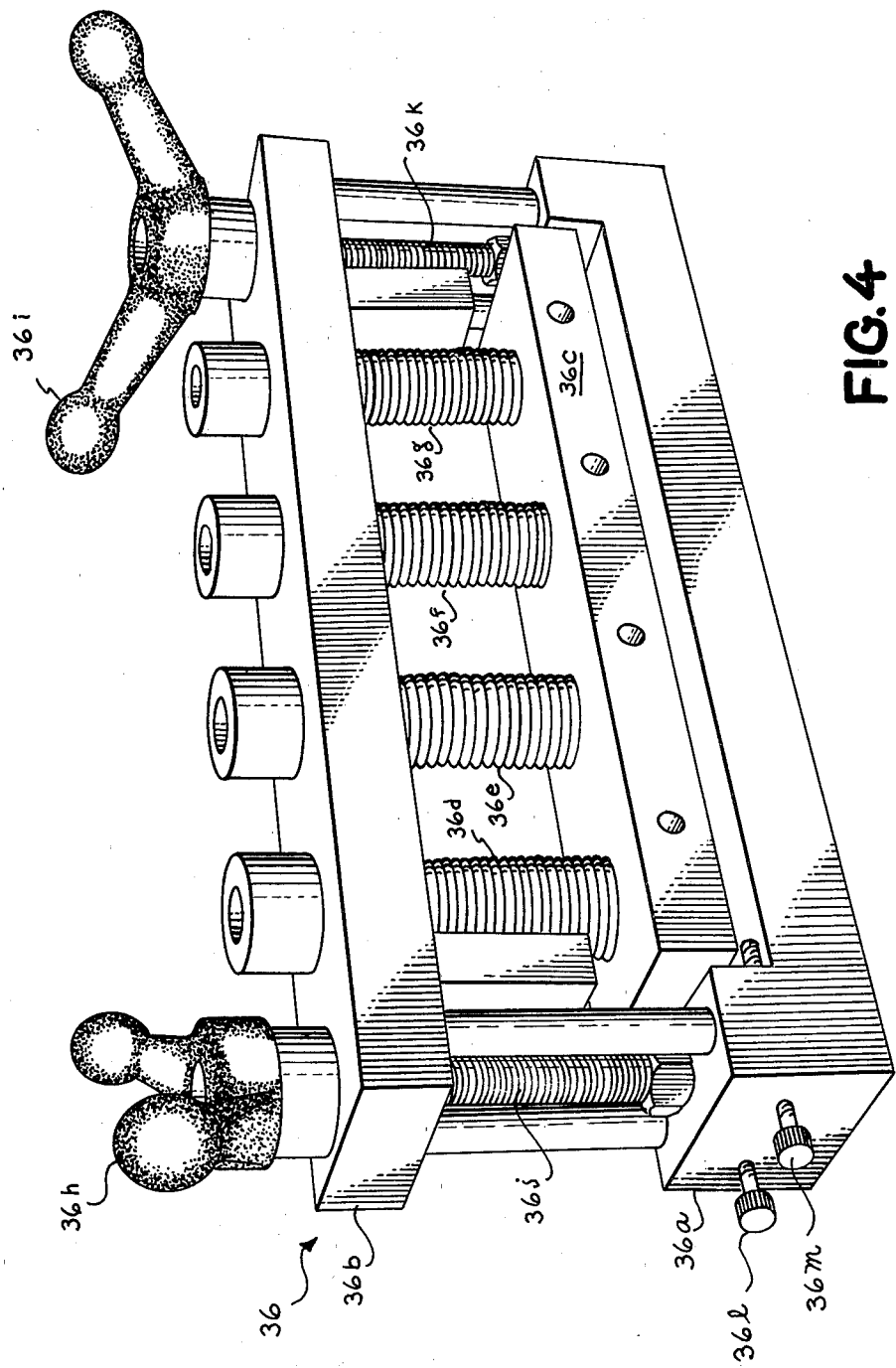
FIG. 4 is a perspective view of a pressing fixture useful in the manufacture of a magnet sub-assembly such as the one shown in FIG. 2.

Now that the configurations and construction of the rigidified pole base member 5 and the more flexible face member 6 of the invention have been described, reference will be made to FIGS. 2, 3 and 4 to describe the preferred embodiment of the magnet sub-assemblies 7 and 8 illustrated therein. At the outset it should be understood that in this form of the invention the magnet sub-assemblies 7 and 8 are about equal in size and each comprise a plurality of generally rectangular magnet bars 24 through 29, as seen in FIGS. 2 and 3. In alternative forms of the invention the magnet sub-assemblies may be made of significantly different sizes, or a single magnet sub-assembly may be used in each pole.

Pursuant to the invention each of the magnet bars 24–29 is formed of a suitable high coercive strength rare earth magnetic material that is generally well-known and that is commercially available from Hitachi Magnetics Corporation of Edmore, Michigan. That corporation supplies such rectangularly shaped bars cut to form within a tolerance of ± 0.005 to 0.010 inches. Cobalt-samarium magnetic material is one example of a rare earth magnetic material that is suitable for forming the magnet bars 24–29 used in the preferred embodiment of the invention.

A pair of substantially flat, magnetically permeable ferrous metal plates 30 and 31 are positioned on opposite sides of the magnets 24–29 and layers of heat curable cement or adhesive 32 and 33 are distributed on the inner surfaces of the plates 30 and 31 to adhere the plates to the magnets 24–29, as best seen in FIG. 2. In the preferred form of the invention the adhesive cement layers 32 and 33 are formed of heat curable epoxy resin adhesive sheets that may be any suitable commercially available adhesive material such as that available from the 3M Company.

In order to complete the designation of identifying numbers in FIG. 1, the magnet sub-assembly 7 is shown as having plate members 30' and 31' which are, respectively, substantially identical to the plates 30 and 31 used in the sub-assembly 8, shown in FIG. 2. Likewise, the end magnet of sub-assembly 7 shown in FIG. 1 is designated as magnet 24' which is substantially identical in shape and magnetic properties to the magnet 24 of sub-assembly 8.

In practicing the invention, after the magnets 24–29 and adhesive sheets 32 and 33 are arranged between plates 30 and 31, pressure is applied to the plates and the adhesive is at least partially cured by baking it. This forms the magnet sub-assembly into a package that is convenient to handle and which has a shelf life of seven to eight months. Accordingly, a large number of such package sub-assemblies can be manufactured and stored until they are required for the manufacture of pole assemblies. At such time, the sub-assemblies are magnetized, as explained below, before they are positioned between a pole base member and face members to make a pole assembly according to the invention. The magnet sub-assemblies are also machined to make the outer surfaces of at least one of the metal plates, 30 or 31, essentially flat, parallel to the outer surface of the opposite plate, and such that the assembly is of the desired thickness. Such machining can be done before the sub-assemblies are stored, or just before they are to be mounted in a pole assembly. The advantage of such machining is that it makes it possible to precisely control the thickness of air gap formed between the pole face member 6 and a motor rotor, such as the rotor 4 shown in FIG. 1.

In order to precisely control the magnetic characteristics of the field pole 3, and its associated field poles (not shown) for the remainder of the machine 1, the respective bar magnets 24–29, etc., used in the magnet sub-assemblies of the present invention are arranged so that the surfaces of the inner ends of the magnet bars in each sub-assembly are in substantial alignment with one another to define a planar surface. By way of example, a suitable arrangement is shown in FIG. 3 where the uppermost ends of the magnet bars 24–29 are shown aligned against an aligning block 34 while a second block 35 is mounted at right angles to it. Other suitable means may be used for aligning the magnets and positioning them in position for cementing.

By thus positioning the magnets it can be seen that the block 34 defines a planar surface 34a in which the abutting ends of the magnets are maintained while they are adhered to plates 30 and 31. Such planar surfaces are also designated by the identifying numerals 34a and 34a' in FIG. 1 where it can be seen that these adjacent surfaces, defined respectively, by the inner ends of the magnets in adjacent sub-assemblies 7 and 8, are positioned to define an angle less than 180°, pursuant to the present invention. Actually, in the preferred form of the invention this angle is approximately 90° to realize desired cost advantages and performance characteristics.

On the other hand, it will be recognized that the outer ends of the magnet bars in the respective magnet sub-assemblies 7 and 8 form relatively irregular surfaces, such as that shown at the bottom portion of FIG. 3. By thus carefully controlling the planar orientation of the bar magnets at their closest proximity to the adjacent magnet sub-assembly in each field pole, it is possible to maximize the magnetic characteristics of the pole structure. Towards this same end, pursuant to the invention, the inner ends of the respective plates 30, 31 and 30' and 31', adhered to opposite sides of the magnet bars of the respective sub-assemblies 7 and 8, terminate immediately adjacent the respective planar surfaces 34a and 34a' that are defined by the inner ends of the magnets in the sub-assemblies.

Before explaining the preferred steps of the method of the invention, it should be noted that the magnet sub-assemblies 7 and 8 are particularly advantageous for use in constructing the field pole 3 because the substantially flat steel plates 30, 31 and 30' and 31', can be relatively easily machined to provide flat sub-assemblies having a uniform thickness of the desired value. Such exactness in manufacture is desirable to assure the design of precisely toleranced air gaps in machines having poles constructed pursuant to the invention. In known prior art pole constructions that utilize permanent magnets, it is common practice to directly machine the Alnico or ceramic type magnets used to form these structures in order to provide low tolerance fits between the magnets and associated pole lamina. It has been found that it is much less costly to machine the plates 30 and 31.

Another advantage of the magnet sub-assemblies of the invention, such as the sub-assembly 8 shown in FIG. 2, is that rectangular blocks of magnet material 24–29 can be assembled between the plates 30 and 31 and the plates adhered thereto by layers of epoxy adhesive 32 and 33 prior to magnetizing the magnets 24–29. Accordingly, it is easier to handle the components of the sub-assemblies during the assembly thereof, and it is also more convenient to handle and store the sub-assemblies in their unmagnetized condition, prior to the time during a manufacturing cycle when they are magnetized and cemented or otherwise mounted into the salient pole configuration shown in FIG. 1. In this connection it should be appreciated that in some embodiments of the invention a suitable mounting means for holding the sub-assemblies 7 and 8 between the pole members 5 and 6 is a pair of spring clips that maintain the sub-assemblies in their desired position.

Now that the novel structural features of the invention have been explained, the method steps of one preferred sequence of the invention will be described. It should be recognized that the three major component parts of the respective pole structures, such as the pole 3 shown in FIG. 1, may be made sequentially or in separate operations simultaneously. In order to form each magnet sub-assembly of the invention for the manufacture of a dynamoelectric machine such as the machine 1 shown in FIG. 1, a predetermined number of magnet sub-assemblies, such as the sub-assembly 8 shown in FIG. 2, will be prepared.

To prepare each such magnet sub-assembly, a pair of substantially flat, magnetically permeable metal plates, such as the plates 30 and 31 shown in FIG. 2, are provided and a plurality of generally rectangular bars 24–29 of rare earth magnet material are provided. Sheets of a suitable adhesive material are positioned between the magnets and the plates 30 and 31. The 3M Company of Minneapolis, Minn. sells such sheets under Catalog No. AF-42. The plates 31 and 32 are then positioned over the opposite sides of the bar magnets 24–29 as shown in FIG. 2. In order to complete the formation of the sub-assembly, a pressing fixture 36, such as that shown in FIG. 4, is provided. It will be recognized that a number of different types of pressing fixture may be used to provide the manufacturing function afforded by the fixture 36. However, in order to enable a full understanding of the method of the invention it should be understood that the pressing fixture 36 includes a base frame member 36a, an upper movable frame member 36b and a movable press plate 36c that is coupled to the upper press plate 36b by four springs 36d, 36e, 36f and 36g. A pair of rotating wing nuts 36h and 36i are threadably mounted for rotation on a pair of threaded studs 36j and 36k at opposite ends of the base frame 36a. A pair of clamping screws 36l and 36m are provided at one end of the fixture.

In practicing the method of the invention, after the magnet sub-assembly 8 is assembled with the uncured layers of sheet adhesive 32 and 33, in the manner just described, it is placed betwhen the upper surface of frame 36a and the press plate 36c of fixture 36. Clamping screws 36l and 36m bearing on the magnet stack are tightened to eliminate gaps in the magnet assembly. The wing nuts 36h and 36i are then tightened to compress the sub-assembly 8 with a predetermined force that is uniformly distributed through the four compressed springs 36d-36g. In the preferred method of the invention this predetermined force is about 50 lbs. per square inch on the sub-assembly 8. With the magnet sub-assembly thus compressed, the fixture 36 is placed in a conventional oven to bake the adhesive sheets 32 and 33 for about one hour at approximately 170° C. thereby to at least partially cure the adhesive and strongly adhere the metal plates 30 and 31 to the respective bar magnets 24-29. Of course, the other magnet sub-assemblies for the machine 1, such as the magnet sub-assembly 7, would subsequently be manufactured in a similar manner pursuant to the invention.

After the necessary number of magnet sub-assemblies are prepared, they may each be machined to make the outer surfaces of one of the metal plates 30 or 31 essentially flat, and parallel to the opposite surface within a predetermined tolerance. The sub-assemblies can then be stored until they are needed to complete the assembly of a pole structure, at which time they are magnetized before being mounted in the pole structure.

Next, a desired number of rigid pole base members such as the base member 5 shown in FIG. 1 are prepared for the manufacture of the machine 1. To manufacture the rigid base members, a suitable fixture such as the fixture 37 shown in FIG. 6 is provided. Again, the fixture 37 may take various suitable forms, but in the preferred method of the invention the fixture 37 comprises a rigid metal frame portion 37a and a pair of end plates 37b and 37c that are coupled together by at least one threaded bolt 37d and associated nut 37e.

In practicing the method of the invention to manufacture each pole base member, such as the base member 5 shown in FIGS. 1 and 6, a plurality of preformed laminae, such as the laminae 5a, 5b, etc. are stacked between the end plates 37b and 37c of the fixture 37. After a sufficient number of the laminae are placed between the end plates to build up a pole of desired width, compression pins 37f, 37g and 37h are tightened to compress the laminae 5a, 5b, etc. under a predetermined force. In the preferred method of the invention this predetermined force is about 150 lbs. per square inch. As the compression pins are tightened, the punchings are pressed downward against the frame portion, 37a, using a "U" shaped pounding block (not shown) to straddle the bolt 37d. After tightening of the compression pins a plurality of spaced weld beads, such as the welds 9-12 described above, are formed by TIG fusion welding along the respective laminae. This welding process rigidifies the base member 5 so that when the compression pins 37f, 37g and 37h are released the rigid pole base member 5 may be removed from fixture 37. Other pole base members can then be subsequently formed in a similar manner, as required in the manufacture of a given machine.

Finally, a number of relatively more flexible pole face members, equal to the number of pole base members for a given machine, will be formed pursuant to the method of the invention. To perform this manufacturing step of the method of the invention a riveting fixture 38, such as that shown in FIG. 7, is provided. The riveting fixture 38 also may be of any suitable form, but in the preferred embodiment illustrated it comprises two end plates 38b and 38c, two guide rods 38a secured in end plate 38c, and a clamping bolt 38d and nut 38e. To manufacture a relatively flexible pole face member, such as the member 6 shown in FIG. 7, a suitable number of punchings 6a, 6b, etc., to provide the desired assembled pole length, are stacked on a plurality of rods, such as rods 16, 17 and 18 shown in FIGS. 1 and 7, then are transferred into the riveting fixture 38 as an integral unit. End plate 38b contains apertures to receive the rods 16-18. End plate 38c contains similarly aligned head detents (not shown) to position rods 16-18. Each of these rods is similar in form to the rod 19 illustrated in FIG. 7, that is, the rods each have a head such as the rounded head 19a shown in FIG. 7 on rod 19. A "V" shaped rail (not shown) is used to align the punchings. Next, the nut 38d is tightened on bolt 38e to apply a compressive force of about 150 psi to the end plates 38b and 38c.

A suitable tool such as the hollow triangularly headed pressing tool 39 shown in FIG. 7 is provided to force the triangular spring clip members 20, 21 and 22 over the respective rods 16, 17 and 18, thereby to resiliently compress the individual lamina 6a, 6b, etc. of the flexible pole base member 6 together. It will be understood that in performing the operation of mounting spring clips 20-22 respectively on the rods 16-18 the head ends of the rods will be supported against one end lamina of the member 6 so that the spring clips exert a tensioning force on the respective rods 16-18 when the clips are resiliently compressed against the other end lamina of the member 6. After the spring clips are thus positioned on the respective rods, the nut 38d is loosened to release the pole face member 6 from between the end plates 38b and 38c.

Figure 8:
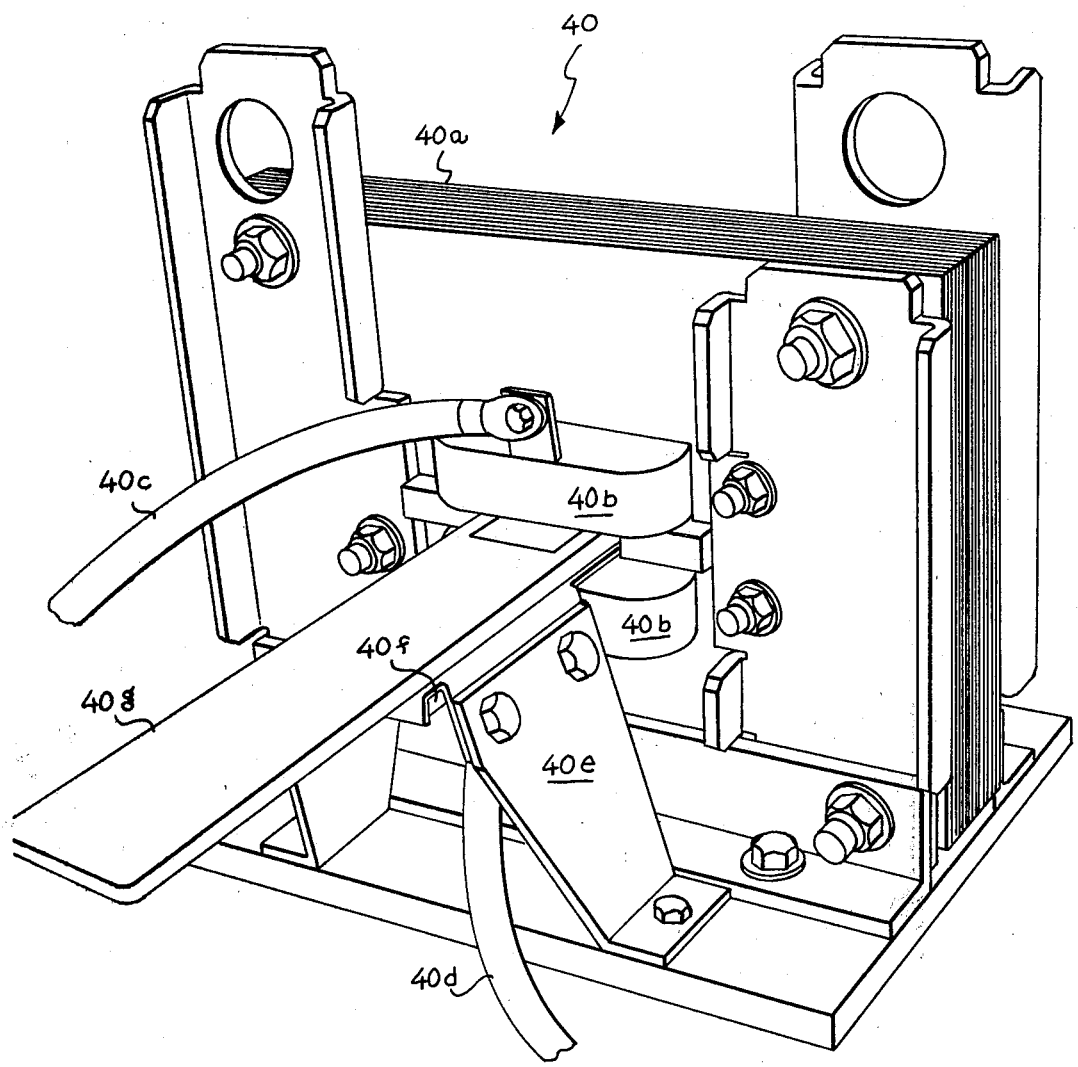
FIG. 8 is a perspective view of a magnetizing fixture constructed pursuant to the invention and used in the manufacture of permanent magnet sub-assemblies for the field pole construction illustrated in FIG. 1.

Before pairs of the magnet sub-assemblies 7 and 8 can be adhered respectively to the rigid pole base member 5 and the flexible face member 6 pursuant to the method of the invention, the bar magnets 24-29 in each sub-assembly should be magnetized. To effect such magnetization there is provided a magnetizing fixture 40, such as is shown in FIG. 8. Various forms of conventional magnetizing fixtures may be used, however, the fixture 40 does include certain novel features. In addition to the magnetic laminated yoke 40a on which there is mounted a magnetizing coil 40b that is supplied by suitable electric cables 40c and 40d, connected respectively to a source of d.c. power (not shown), the fixture 40 includes a permanent magnet support member 40e and a substantially similar magnet support member (not shown) mounted on the opposite side of the fixtue 40. The magnet support member 40e and its opposite counterpart are provided with permanent magnets, such as the permanent magnet 40f fixed beneath the top of support member 40e. These permanent magnets 40f, and their counterparts on the opposite side of fixture 40, are effective to closely shield zones of the bar magnets 24–29 in the magnet sub-assemblies 7, 8, etc., from demagnetization caused by the external leakage magnetic field both before and after magnetization, as these sub-assemblies are moved successively in steps through the magnetizing fixture 40 to sequentially magnetize zones of the bar magnets 24–29.

Figure 9:
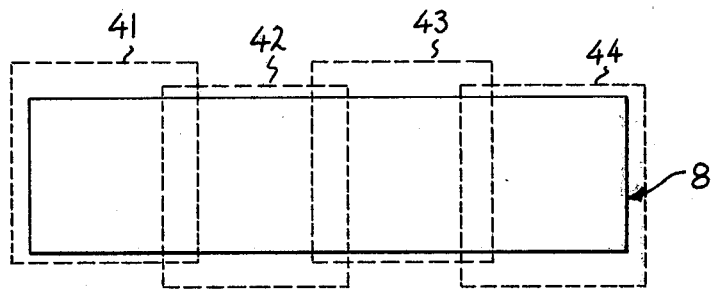
FIG. 9 is a top plan view of one bar magnet sub-assembly of the type illustrated in FIG. 2 above. The sub-assembly is shown in relation to a plurality of magnetizing zones designated by dashed lines for the purpose of explaining the sectionalized magnetizing process of the present invention.

In order to conveniently move the magnet sub-assemblies 7, 8, etc., sequentially through the magnetizing fixture 40, a movable plastic pusher 40g is used to manually push each sub-assembly under the magnetizing coil 40b in successive steps to magnetize it in overlapping zones, such as the zones indicated by the dashed boxes 41, 42, 43 and 44 in FIG. 9. By thus progresssively magnetizing the magnet sub-assemblies this process step of the invention reduces the size and cost of the magnetizing fixture 40 that is needed, as well as that of the associated power supply that energizes the coil 40b through cables 40c and 40d. In practicing the method of the invention the pulse power supply provides a magnetizing field of about 32,000 Oersteds momentarily in each of the zones 41–44 of the respective magnet sub-assemblies thereby to appropriately magnetize them.

The last step in practicing the method of the invention is that of final assembly and curing of the magnet sub-assemblies 7 and 8 and the rigid pole base member 5 and the flexible pole face number 6. This is done by first applying with a brush an epoxy adhesive such as Hysol EA-9500, manufactured by Hysol Division of the Dexter Corporation located in Olean, N.Y., to the mating surfaces of the pole base and pole face members. The cement is then dried to facilitate handling of the parts by a 30-minute bake at 77° C.

Figure 10:
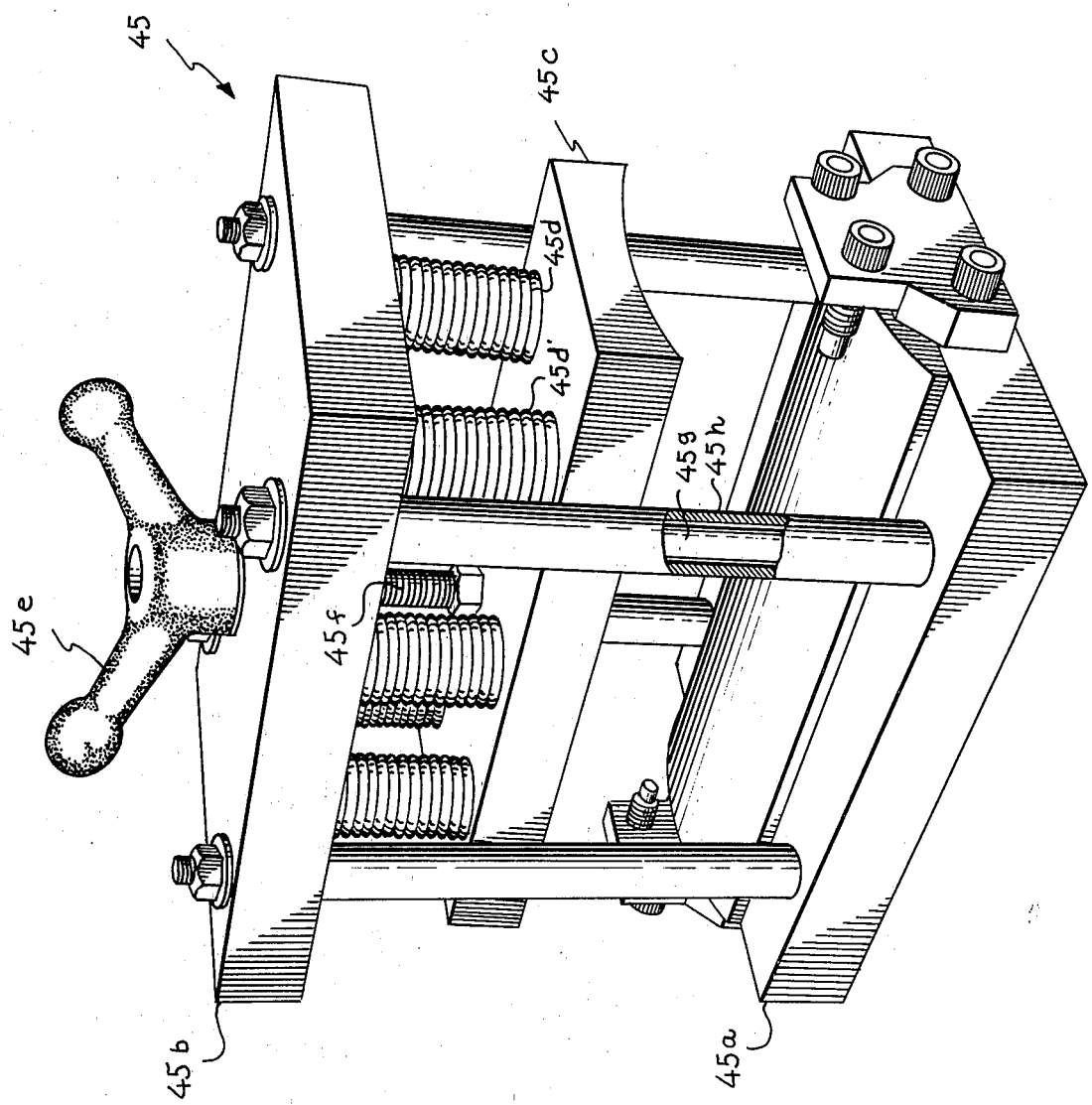
FIG. 10 is a perspective view of a final assembly and curing fixture that is used in practicing the method of the invention to apply a compressive force to the pole face member, a pole base member, and a plurality of permanent magnet sub-assemblies secured therebetween while a suitable adhesive or potting compound is cured to secure the members together pursuant to the method of the invention.
Figure 12:
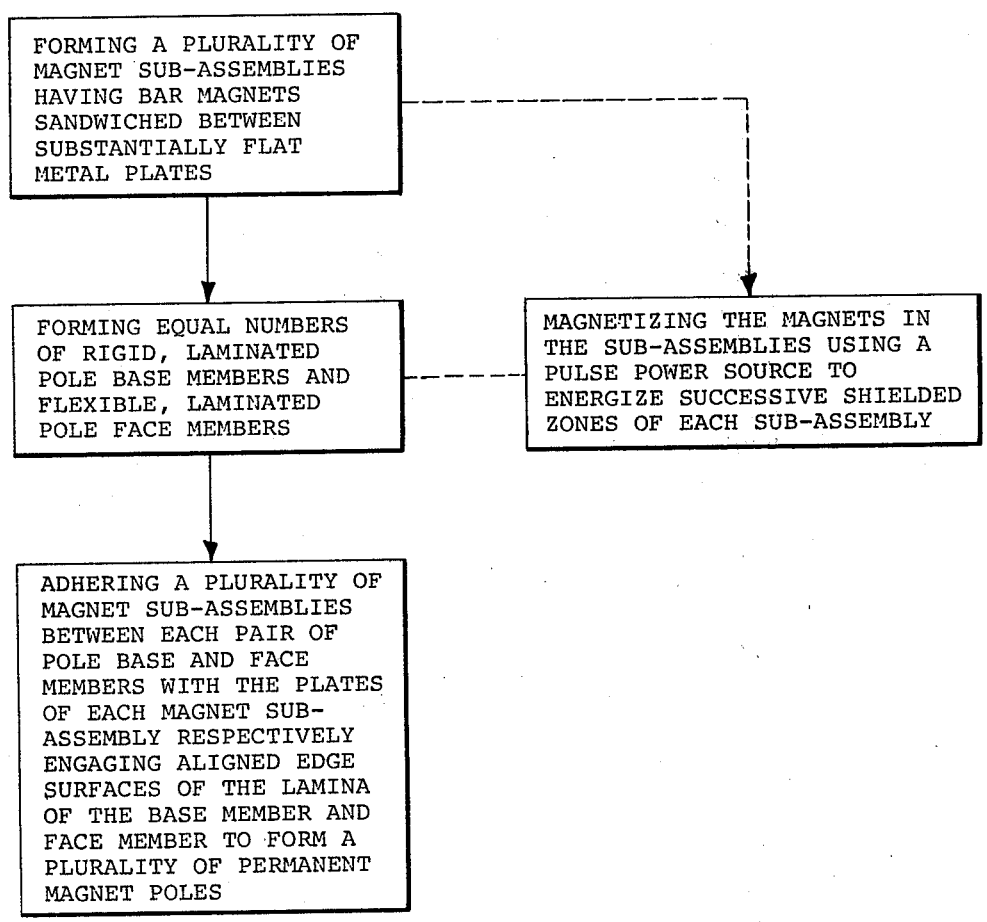
FIG. 12 is a chart illustrating the method steps of preferred embodiments of the invention.

A final assembly and cure fixture 45 is shown in FIG. 10 in an open position which includes four corner studs 45g and four respective sleeves 45h in place to separate the rigid steel base frame 45a and a movable upper frame member 45b. A pressing plate 45c is shown in its raised position, held in place by a threaded stud 45f that is supported by a wing nut 45e. A plurality of compression springs 45d, 45d', etc., exert a downward thrust on the pressing plate 45c.

Using the final assembly and curing fixture 45 provided pursuant to the method of the invention, one of the flexible pole face members 6, coated with epoxy, is positioned on the base frame 45a of the fixture and a pair of magnet sub-assemblies such as the sub-assemblies 7 and 8 previously magnetized are positioned on the flexible base member in the general orientation shown in FIG. 1. Then, a rigid pole base member such as the base member 5, also coated with epoxy, is positioned above the magnet sub-assemblies, in the orientation illustrated in FIG. 1.

Figure 11:
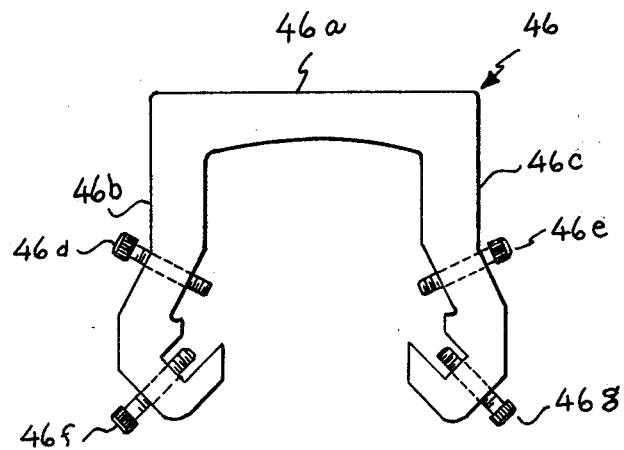
FIG. 11 is a side elevation of a clamping fixture used with the curing and assembly fixture illustrated in FIG. 10 to clamp a plurality of permanent magnet sub-assemblies in a desired relationship to the pole face and pole base members pursuant to the method of the invention while the adhesive of the pole structure is being cured pursuant to the method of the invention.

In order to overcome the magnetic forces of repulsion and to hold the magnet sub-assemblies 7 and 8 in this desired relationship pursuant to the method of the invention, we find it useful to provide two clamps 46, such as shown in FIG. 11. These clamps are generally U-shaped having a base portion 46a and leg portions 46b and 46c. Four set screws, 46d, 46e, 46f and 46g, are located in tapped apertures through the clamp, as shown in FIG. 11. In operation, the clamps (46) are placed over the ends of the pole assembly and the set screws 46d and 46e are adjusted to engage the respective outside surfaces of the pole base member 5 while set screws 46f and 46g are adjusted to engage the respective magnet sub-assemblies 7 and 8. This engagement serves to prevent the magnet sub-assemblies from being forced outward by magnetic forces of repulsion from between the relatively flexible face member 6 and the rigid pole base member 5.

With the component parts of the pole assembled in the manner just described in fixture 45, the wing nut 45e is rotated to lower the pressing plate 45c to mate with pole base number 5. Next, the four sleeves 45h are removed one at a time by dis-assembling and re-assembling the four corner studs 45g. Finally, the corner studs are tightened to compress the springs 45d, 45d' to exert a downward compressive force of approximately 50 pounds per square inch pressure on the pole assembly through the press plate 45c. Then, the fixture and the clamped components of the pole are placed in a suitable conventional oven for baking the adhesive layers sufficiently to cause them to adhere to the surfaces juxtaposed with them and cure to form a strong adhering bond between the components of the pole structure. It has been found that a baking cycle of about 1 hour at a temperature of approximately 120° C. is sufficient to cure the adhesive completely for purposes of the present invention.

It should be recognized that other forms of suitable adhesive, rather than the adhesive sheets and the liquid epoxy adhesives described relative to the assembly of the magnet packs and poles may be used in practicing the method of the invention. Of course, after a suitable number of such pole structures are thus formed, pursuant to the foregoing method steps of the invention, they will be mounted in a conventional manner, such as by bolting them with bolts 47a, as shown in FIG. 1, to pre-selected points on the stator 2 of the machine 1.

From the foregoing description of the uniques structural and method features of the invention, it will be apparent that various modifications and alternative forms of the invention may be made without departing from the scope of the invention. It is our intention to define the true spirit and limits of the invention within the scope of the following claims.

What we claim as new and desire to secure by Letters Patent of the United States:

1. A method of manufacturing a dynamoelectric permanent magnet machine field pole comprising the steps of:
   a. making a rigid laminated pole base member by stacking a plurality of pre-formed base member lamina and welding them together,
   b. making a relatively more flexible laminated pole face member by stacking a plurality of pre-formed face member lamina and securing them together by inserting a plurality of rods through aligned apertures in the lamina and positioning lamina-holding means on opposite ends of the rods,
   c. making at least one rare earth magnet sub-assembly, each of said at least one sub-assembly having a plurality of bar magnets mounted between a pair of magnetically permeable metal plates, and
   d. adhering the base member to one metal plate of at lest one magnet sub-assembly and adhering the pole face member to the other metal plate of said magnet sub-assembly.

2. A method of manufacture as defined in claim 1 including the following steps in practicing step (c) thereof:

(c-1) arranging a plurality of generally rectangular bar magnets in side-by-side relationship with one of their respective ends in alignment, (c-2) applying an epoxy adhesive to two opposite surfaces of each magnet and placing each metal plate respectively against one of said opposite surfaces, (c-3) applying a predetermined force to compress the plates against the magnets, and (c-4) curing the adhesive while the magnets and plates are thus compressed thereby forming magnet sub-assemblies.

3. A method of manufacture as defined in claim 1 including the following steps in practicing step (d) thereof:

(d-1) applying an epoxy adhesive to the surfaces of the pole face member and pole base member adapted to abut the magnet sub-assemblies, (d-2) positioning the magnet sub-assemblies between said adhesive-coated pole face member and base member surfaces, (d-3) applying a predetermined force to compress the face member and base member against the magnet sub-assemblies, and (d-4) curing the adhesive while the face member, base member and magnet sub-assemblies are thus compressed thereby forming a field pole structure.

4. A method of manufacture as defined in claim 3 including the following steps in practicing step (b) thereof:

(b-1) providing a plurality of rods having heads at one end thereof, (b-2) inserting said rods through aligned apertures in the face member lamina to place the heads of the rods against one of the outer lamina, (b-3) forcing a spring clip on the other end of each of said rods to resiliently compress each of the clips against the other outer lamina of the face member thereby to flexibly hold the lamina in compression.

5. A method of manufacture as defined in claim 2 including the following steps in practicing step (c) thereof:

(c-5) magnetizing the magnet sub-assemblies, progressively, in sections by moving them through a laminated magnetizing fixture.

6. A method of manufacture as defined in claim 5 including the following step in practicing step (c) thereof:

(c-6) using a pulse power source to energize a predetermined zone of said magnetizing fixture, and (c-7) shielding the boundaries of said zone of the fixture by mounting permanent magnets on opposite sides of it adjacent the path of movement of the magnet sub-assemblies through the fixture.

* * * * *